(12) United States Patent
Suzuki et al.

(10) Patent No.: US 12,062,502 B2
(45) Date of Patent: *Aug. 13, 2024

(54) ELECTROLYTIC CAPACITOR AND MANUFACTURING METHOD THEREOF

(71) Applicant: PANASONIC INTELLECTUAL PROPERTY MANAGEMENT CO., LTD., Osaka (JP)

(72) Inventors: Shinya Suzuki, Kyoto (JP); Masahiro Kajimura, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/299,441

(22) Filed: Apr. 12, 2023

(65) Prior Publication Data

US 2023/0253163 A1   Aug. 10, 2023

Related U.S. Application Data

(62) Division of application No. 16/651,899, filed as application No. PCT/JP2018/036022 on Sep. 27, 2018, now Pat. No. 11,670,460.

(30) Foreign Application Priority Data

| Sep. 28, 2017 | (JP) | 2017-189037 |
| Sep. 28, 2017 | (JP) | 2017-189038 |
| Sep. 28, 2017 | (JP) | 2017-189039 |

(51) Int. Cl.
  *H01G 9/048* (2006.01)
  *H01G 9/00* (2006.01)
  (Continued)

(52) U.S. Cl.
  CPC .......... *H01G 9/048* (2013.01); *H01G 9/0032* (2013.01); *H01G 9/012* (2013.01); *H01G 9/07* (2013.01); *H01G 9/08* (2013.01)

(58) Field of Classification Search
  None
  See application file for complete search history.

(56) References Cited

U.S. PATENT DOCUMENTS

| 5,349,496 A | 9/1994 | Taniguchi et al. |
| 5,377,073 A | 12/1994 | Fukaumi et al. |
| 6,563,693 B2* | 5/2003 | Nakada .................. H01G 9/15 361/531 |

(Continued)

FOREIGN PATENT DOCUMENTS

| JP | 2002-319522 A | 10/2002 |
| JP | 2003-086459 A | 3/2003 |

(Continued)

OTHER PUBLICATIONS

International Search Report and Written Opinion issued in International Patent Application No. PCT/JP2018/036022, dated Dec. 25, 2018; with partial English translation.

(Continued)

*Primary Examiner* — Eric W Thomas
(74) *Attorney, Agent, or Firm* — Rimon P.C.

(57) ABSTRACT

To provide an electrolytic capacitor with improved reliability. The electrolytic capacitor including: at least one capacitor element including an anode foil having a first part including a first end, and a second part including a second end, a dielectric layer formed on at least a surface of the second part, and a cathode part covering at least part of the dielectric layer; a package body enclosing the capacitor element; and an external electrode. At least a surface of the second part has a porous portion, and at least an end face of the first end is exposed from the package body and is in contact with the external electrode.

9 Claims, 4 Drawing Sheets

(51) Int. Cl.
*H01G 9/012* (2006.01)
*H01G 9/07* (2006.01)
*H01G 9/08* (2006.01)

(56) References Cited

U.S. PATENT DOCUMENTS

| | | | |
|---|---|---|---|
| 11,670,460 B2 * | 6/2023 | Suzuki | H01G 9/048 361/528 |
| 2002/0001169 A1 | 1/2002 | Shiraishi et al. | |
| 2003/0026064 A1 | 2/2003 | Nakada et al. | |
| 2004/0264111 A1 | 12/2004 | Shimoyama et al. | |
| 2009/0201631 A1 | 8/2009 | Kasuga et al. | |
| 2011/0149477 A1 | 6/2011 | Summey et al. | |
| 2011/0157776 A1 * | 6/2011 | Ishida | H01G 9/0029 29/25.03 |
| 2016/0071654 A1 | 3/2016 | Kimura et al. | |
| 2017/0140877 A1 | 5/2017 | Kuromi | |
| 2017/0178821 A1 | 6/2017 | Summey et al. | |
| 2017/0365419 A1 | 12/2017 | Demizu et al. | |
| 2019/0237266 A1 | 8/2019 | Tsutsumi | |

FOREIGN PATENT DOCUMENTS

| | | |
|---|---|---|
| JP | 2004-241435 A | 8/2004 |
| JP | 2009-076872 A | 4/2009 |
| JP | 2009-194061 A | 8/2009 |
| JP | 2017-098297 A | 6/2017 |
| WO | 2013/046869 A1 | 4/2013 |

OTHER PUBLICATIONS

Non-Final Office Action dated May 24, 2021 issued in U.S. Appl. No. 16/651,899.
Final Office Action dated Dec. 7, 2021 issued in U.S. Appl. No. 16/651,899.
Non-Final Office Action dated May 19, 2022 issued in U.S. Appl. No. 16/651,899.
Final Office Action dated Oct. 20, 2022 issued in U.S. Appl. No. 16/651,899.
Notice of Allowance dated Jan. 13, 2023 issued in U.S. Appl. No. 16/651,899.

\* cited by examiner

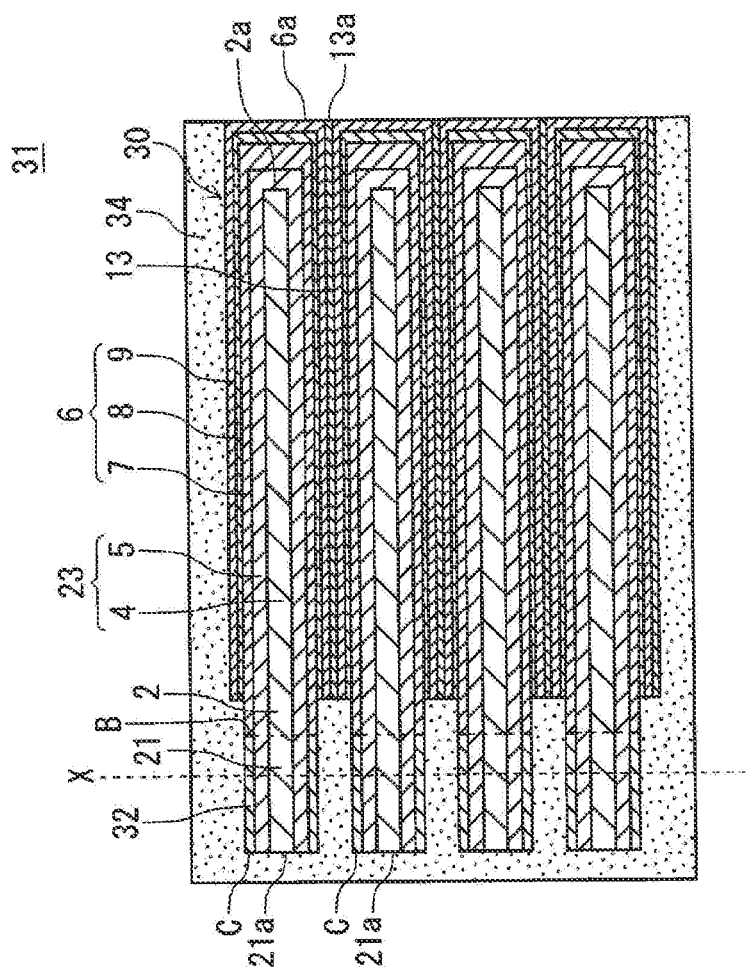

ELECTROLYTIC CAPACITOR AND MANUFACTURING METHOD THEREOF

CROSS REFERENCE OF RELATED APPLICATIONS

This application is a Divisional of U.S. patent application Ser. No. 16/651,899, filed on Mar. 27, 2020, now U.S. Pat. No. 11,670,460, which is the U.S. National Phase under 35 U.S.C. § 371 of International Patent Application No. PCT/JP2018/036022, filed on Sep. 27, 2018, which in turn claims the benefit of Japanese Application No. 2017-189037, filed on Sep. 28, 2017, Japanese Patent Application No. 2017-189038, filed on Sep. 28, 2017, and Japanese Patent Application No. 2017-189039, filed on Sep. 28, 2017, the entire disclosures of which Applications are incorporated by reference herein.

TECHNICAL FIELD

The present invention relates to an electrolytic capacitor and a manufacturing method of the electrolytic capacitor.

BACKGROUND ART

An electrolytic capacitor includes a capacitor element, a package body enclosing the capacitor element, and an external electrode electrically connected to the capacitor element on the anode side. The capacitor element includes: an anode foil having a first part (sometimes referred to as an anode leading part) including a first end, and a second part (sometimes referred to as a cathode forming part) including a second end; a dielectric layer formed on at least a surface of the second part of the anode foil; and a cathode part covering at least part of the dielectric layer.

Patent Literature 1 discloses a solid electrolytic capacitor in which an anode body is partially exposed from the package body, and the exposed portion is coated with a plating layer through which the anode body is connected to an electrically conductive elastic member.

In Patent Literature 2, a diffusion layer is formed on the anode foil at a portion exposed from the packaging body, and a base electrode is formed on the diffusion layer.

CITATION LIST

Patent Literature

[PTL 1] Japanese Laid-Open Patent Publication No. 2002-319522
[PTL 2] Japanese Laid-Open Patent Publication No. 2009-76872

SUMMARY OF INVENTION

Technical Problem

Typically, the package body includes a resin and is formed using a molding technique, such as injection molding. The formed package body, however, sometimes fails to come in sufficiently close contact with the anode leading part. Lack of close contact between the package body and the anode leading part may allow air (specifically, oxygen and water) to enter inside the electrolytic capacitor through the boundary between the first end and the package body along the interface between the anode leading part and the package body.

When air enters inside the electrolytic capacitor, this sometimes reduces the reliability of the electrolytic capacitor. For example, it may occur that the air having entered inside the electrolytic capacitor contacts the cathode part and causes the solid electrolyte layer included in the cathode part to deteriorate, resulting in an increased equivalent series resistance (ESR).

Solution to Problem

One aspect of the present invention relates to an electrolytic capacitor including:
at least one capacitor element including
an anode foil having a first part including a first end, and a second part including a second end,
a dielectric layer formed on at least a surface of the second part, and
a cathode part covering at least part of the dielectric layer;
a package body enclosing the capacitor element; and
an external electrode, wherein
at least a surface (specifically, a surface layer) of the second part has a porous portion, and
at least an end face of the first end is in contact with the external electrode.

Another aspect of the present invention relates to a manufacturing method of an electrolytic capacitor, the method including:
a first step of preparing an anode foil having a first part including one end, and a second part including an other end opposite the one end, the anode foil having a dielectric layer formed on at least a surface of the second part;
a second step of forming a cathode part covering at least part of the dielectric layer, to obtain a capacitor element;
a third step of covering at least one the capacitor element with a package body;
a fourth step of forming an end face of the first part, on a side of the one end, after the third step, to expose the end face from the package body; and
a fifth step of bringing the end face of the first part into contact with an external electrode.

Advantageous Effects of Invention

According to the present invention, an electrolytic capacitor with improved reliability can be provided.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWINGS

FIG. 4 A schematic cross-sectional view of an intermediate product produced by a third step of a manufacturing

DESCRIPTION OF EMBODIMENTS

[Electrolytic Capacitor]

Figure 1:
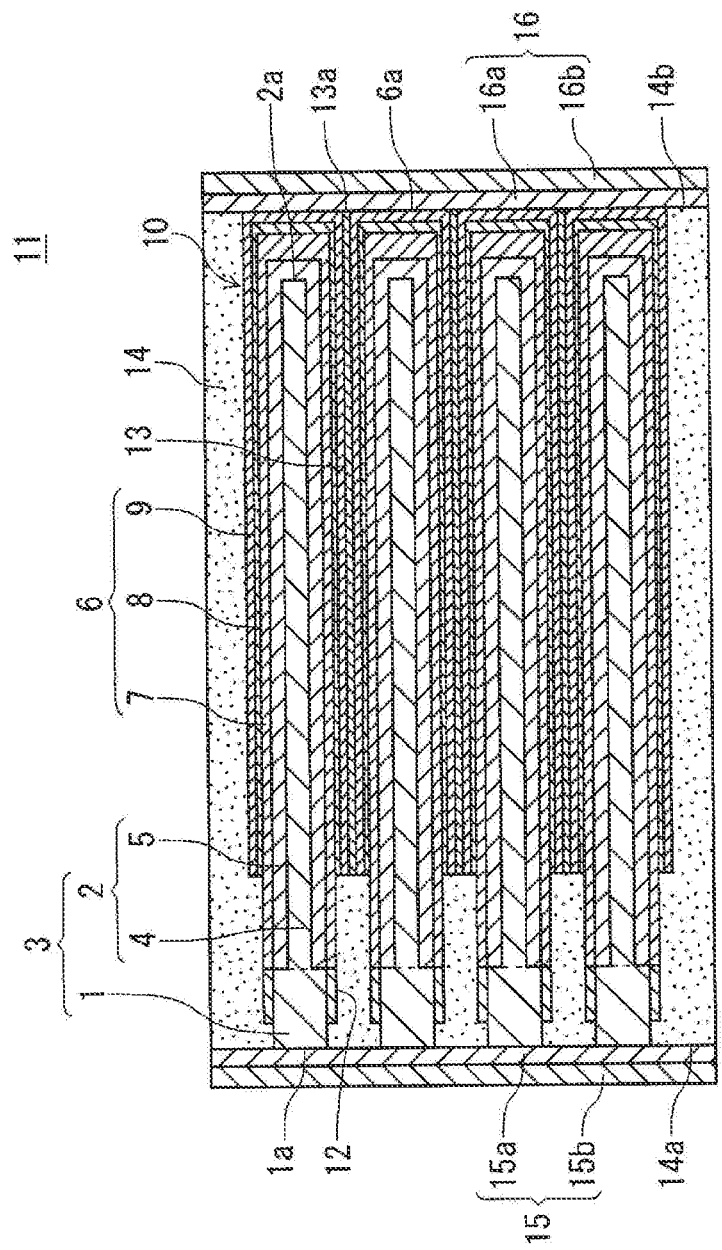
FIG. 1 A schematic cross-sectional view of an electrolytic capacitor according to a first embodiment of the present invention.

An electrolytic capacitor according to one aspect of the present invention includes at least one capacitor element, a package body enclosing the capacitor element, and an external electrode. The capacitor element includes: an anode foil having a first part (or an anode leading part) including a first end, and a second part (or a cathode forming part) including a second end; a dielectric layer formed on at least a surface of the second part; and a cathode part covering at least part of the dielectric layer. At least a surface (specifically, a surface layer) of the second part has a porous portion. At least part of the first end (e.g., at least part of an end face thereof) is not covered with the package body and is in contact with the external electrode.

As least the end face of the first end exposed from the package body is electrically connected to the external electrode, and thereby the external electrode is electrically connected to the capacitor element on the anode side. Specifically, at least the end face of the first end is brought into contact with and thereby electrically connected to the external electrode. At least the end face of the first end may be joined to the external electrode.

According to the above aspect, in which the first part, except the first end, is covered with the package body, an improved close contact between the package body and the first part can be achieved. It is therefore possible to suppress the entry of air (specifically, oxygen and water) into the electrolytic capacitor through the interface between the package body and the first part, as well as to suppress the reduction in reliability of the electrolytic capacitor due to the entry of the air.

The cathode part typically includes a solid electrolyte layer covering at least part of the dielectric layer, and a cathode leading layer covering at least part of the solid electrolyte layer. In the present specification, part of the anode foil where the solid electrolyte layer is formed on the anode foil is referred to as the second part; part of the anode foil where no solid electrolyte layer is formed on the anode foil is referred to as the first part. The solid electrolyte layer is formed on the anode foil, with the dielectric layer interposed therebetween.

First Embodiment

In a first embodiment of the present invention, a surface (specifically, a surface layer) of the second part has a porous portion, while a surface (specifically, a surface layer) of the first part has no porous portion. The porous portion is formed, for example, by roughening a surface of the anode foil. Therefore, specifically, the second part has a core portion and a porous portion (roughened surface layer) formed on a surface of the core portion.

In the first embodiment, the first part has no porous portion at its surface, and in this state, is covered with the package body, except the first end. This can improve the close contact between the package body and the first part. Therefore, the entry of air into the electrolytic capacitor through the interface between the package body and the first part, as well as the reduction in reliability of the electrolytic capacitor due to the entry of the air can be suppressed.

Furthermore, since no porous portion is formed at the surface of the first part, air is unlikely to enter inside the electrolytic capacitor from a portion of the first end exposed from the package body along the pores of the porous portion, and the reduction in reliability of the electrolytic capacitor due to the entry of the air is unlikely to occur.

Moreover, the portion of the first end exposed from the package body (specifically, at least the end face of the first end) has no porous portion. Therefore, a low-resistance and stable connection can be achieved between the first end and the external terminal, and the ESR of the electrolytic capacitor can be reduced.

Second Embodiment

In an electrolytic capacitor according to a second embodiment, the capacitor element further includes an electrically insulating member insulating the first part from the cathode part.

The insulating member has an end A on the first end side and an end B on the second part side. In other words, the insulating member is disposed on the first part, and the first part is covered with the package body, with the insulating member interposed therebetween. Interposing the insulating member between the package body and the first part can improve the close contact between the package body and the first part.

The end face of the first end and the end face of the end A are exposed from the package body. In other words, the first end and the end A each have an end face exposed from the package body, the end faces flush with each other, and the end face of the end A exposed from the package body is present between the end face of the first end exposed form the package body and a surface of the package body. Therefore, the first end and the package body are unlikely to have a gap therebetween. It is to be noted that "flush with each other" herein includes a state where at least one of the end faces of the first end and the end A slightly protrudes from the package body.

As a result of the above, the entry of air (specifically, oxygen and water) into the electrolytic capacitor through the boundary between the first end and the package body along the interface between the first part and the package body, as well as the reduction in reliability of the electrolytic capacitor due to the entry of the air can be suppressed.

Third Embodiment

An electrolytic capacitor according to a third embodiment of the present invention includes a stack of a plurality of the capacitor elements. The stack includes a spacer disposed between the capacitor elements adjacent to each other, on the first part side. The end face of the first end and an end face of the spacer are each exposed from the package body and in contact with the external electrode.

The spacer provides a space between the first parts adjacent to each other and can maintain the space while the capacitor elements are stacked into a capacitor element stack. Thus, in forming a package body, the space between the first parts can be easily filled with a resin or other similar materials, which can improve the close contact between the first parts and the package body.

When the surface of the first part has the porous portion (porous body), the porous portion and the package body sometimes fail to closely contact with each other. In this case, air (specifically, oxygen and water) may enter inside the electrolytic capacitor through the contacting surfaces between the porous portion and the package body. However, by closing a surface of the porous portion with the spacer, thereby to reduce the area where the package body is in contact with the porous portion, the entry of air into the electrolytic capacitor through the contacting surfaces between the porous portion and the package body can be suppressed, and the reduction in reliability of the electrolytic capacitor due to the entry of the air can be suppressed. As a result, the increase in ESR over time in the electrolytic capacitor can be suppressed.

Moreover, by using a material having high affinity to the external electrode as the spacer, the connectivity between the capacitor element stack and the external electrode can be improved, and the external electrode can be closely brought into contact with the capacitor element stack. Therefore, the external electrode is unlikely to peel off from the package body, enhancing the reliability of the connection between the external electrode and the first parts.

Furthermore, since the external electrode and the first parts are closely brought into contact with each other via the spacer, a low-resistance and stable connection can be achieved between the first parts and the external electrode, and the initial ESR of the electrolytic capacitor can be reduced.

The spacer is preferably made of an electrically conductive material, more preferably a metal material. By using an electrically conductive material as the spacer, the external electrode and the spacer are electrically connected to each other, and the ESR of the electrolytic capacitor can be further reduced.

The adjacent first parts and the spacer therebetween may be electrically connected to each other by welding. By connecting them by welding, the ESR of the electrolytic capacitor can be reduced even when the first parts have the porous portion at their surfaces. The welding method includes, for example, resistance welding, laser welding, and ultrasonic welding. In addition, welding can strengthen the physical connection (close contact) between the first parts and the spacer, leading to a further reduced ESR of the electrolytic capacitor.

In the anode foil, at least the surface of the second part is roughened by, for example, etching. Therefore, the second part has a core portion and a porous portion formed on a surface of the core portion. The surface of the first part may also be roughened by, for example, etching, so that the first part has a porous portion (porous body) at its surface. In this case, the porous portion of the first part (porous body portion) can be joined in a compressed state to the spacer. By compressing the porous portion of the first part in advance so that the pores of the porous portion are crushed, the entry of air into the electrolytic capacitor from the first end exposed from the package body along the porous portion, as well as the reduction in reliability of the electrolytic capacitor due to the entry of the air can be further suppressed.

A detailed description will be given below of the component elements of the electrolytic capacitors according to the above aspects including the embodiments.

(Anode Foil)

The anode foil may include, for example, a valve metal, an alloy containing a valve metal, and a compound containing a valve metal (e.g., intermetallic compound). These materials can be used singly or in combination of two or more kinds. Examples of the valve metal include aluminum, tantalum, niobium, and titanium.

Typically, to increase the surface area, a porous portion is formed at at least the surface of the second part of the anode foil. The porous portion may be formed by roughening at least the surface of the second part of the anode foil by, for example, etching. A surface roughening treatment like etching may be applied, with the surface of the first part masked with a predetermined masking member. On the other hand, a surface roughening treatment like etching may be applied to the entire surface of the anode foil. The former provides an anode foil having no porous portion at the surface of the first part and having a porous portion at the surface of the second part. The latter forms a porous portion at the surface of the first part, in addition to at the surface of the second part. The etching treatment may be performed by a known technique, for example, an electrolytic etching. The masking member is not limited, and may be an electrical insulator such as a resin, or an electrical conductor containing an electrically conductive material.

(Dielectric Layer)

The dielectric layer can be formed by, for example, anodizing the valve metal at at least the surface of the second part of the anode foil by chemical treatment. The dielectric layer contains an oxide of a valve metal. For example, when the valve metal is aluminum, the dielectric layer contains aluminum oxide. The dielectric layer is formed at least along the surface of the second part where the porous portion is formed (including the inner wall surfaces of the pores of the porous portion). Without limited thereto, the dielectric layer may be formed by any method that can form an electrical insulating layer to function as a dielectric. The dielectric layer may be formed also on the surface of the first part (e.g., on the porous portion at the surface of the first part).

(Cathode Part)

The cathode part includes a solid electrolyte layer covering at least part of the dielectric layer, and a cathode leading layer covering at least part of the solid electrolyte layer. A description will be given below of the solid electrolyte layer and the cathode leading layer.

(Solid Electrolyte Layer)

The solid electrolyte layer includes, for example, an electrically conductive polymer. Examples of the conductive polymer include polypyrrole, polythiophene, polyaniline, and derivatives thereof. The solid electrolyte layer can be formed by, for example, chemically polymerizing and/or electrolytically polymerizing a raw material monomer on the dielectric layer. Alternatively, it can be formed by applying a solution or dispersion of the conductive polymer onto the dielectric layer. The solid electrolyte layer may include a manganese compound.

(Cathode Leading Layer)

The cathode leading layer includes a carbon layer and a silver paste layer. The carbon layer is electrically conductive, and can be formed of, for example, an electrically conductive carbon material, such as graphite. The carbon layer can be formed by, for example, applying a carbon paste onto at least part of a surface of the solid electrolyte layer. The silver paste layer may be formed of, for example, a composition containing silver powder and binder resin (e.g., epoxy resin). The silver paste layer can be formed by, for example, applying a silver paste onto a surface of the carbon layer. Without limited thereto, the cathode leading layer may have any configuration that has a current collecting function.

(Insulating Member)

The insulating member included in the capacitor element provides insulation between the first part and the cathode part, and is sometimes called an insulation layer. The insulating member is in close contact with the first part and the package body. This can suppress the entry of air into the electrolytic capacitor. The insulating member may be disposed on the first part, with the dielectric layer interposed therebetween.

The insulating member includes, for example, a resin, and may be, for example, those as exemplified for the later-described package body.

The insulating member in close contact with the first part can be obtained by, for example, bonding a sheet-like insulating member (e.g., resin tape) to the first part. In the case of using an anode foil having a porous portion at its surface, the porous portion of the first part may be compressed and flattened, and then, the insulating member may be closely brought into contact with the first part. The sheet-like insulating member preferably has an adhesive layer at the surface facing the first part.

Alternatively, the insulating member in close contact with the first part may be formed by applying or immersing a liquid resin onto or into the first part. In the method using a liquid resin, the insulating member is formed so as to fill the unevenness of the surface of the porous portion of the first part. The liquid resin can easily flow into the recesses on the surface of the porous portion, facilitating the formation of the insulating member inside the recesses, too. The liquid resin may be, for example, a curable resin composition as exemplified in the later-described third step.

The insulating member preferably has a length measured from the end A to the end B (length L shown in FIG. 2) of 0.5 mm or more and 3 mm or less. When the length of the insulating member measured from the end A to the end B is 0.5 mm or more, the first part can be more reliably insulated from the cathode part. In this case, the insulating member can be sufficiently closely brought into contact with the first part and the package body. Therefore, in partially cutting away the insulating member and the first part, the insulating member is unlikely to peel off from the package body and the first part. When the length of the insulating member measured from the end A to the end B is 3 mm or less, the ratio of the second part in the anode foil can be sufficiently increased, leading to a higher capacitance.

(Package Body)

The package body preferably includes, for example, a cured product of a curable resin composition, and may include a thermoplastic resin or a composition containing a thermoplastic resin.

The package body can be formed using, for example, a molding technique, such as injection molding. The package body can be formed by, for example, charging a curable resin composition or a thermoplastic resin (composition) into a predetermined place, using a predetermined mold, so as to cover the capacitor element.

The curable resin composition may contain, in addition to a curable resin, for example, a filler, a curing agent, a polymerization initiator, and/or a catalyst. The curable resin is, for example, a thermosetting resin. The curing agent, the polymerization initiator, the catalyst, and other additional materials are selected as appropriate according to the kind of the curable resin.

The curable resin composition and the thermoplastic resin (composition) may be, for example, those as exemplified in the later-described third step.

The insulating member and the package body each preferably include a resin, in view of the close contact between the insulating member and the package body. The package body is more likely to come in close contact with the insulating member including a resin than with the first part containing a valve metal or the dielectric layer containing an oxide of the valve metal.

The insulating member and the package body preferably include the same material as each other. In this case, the insulating member and the package body can be more closely in contact with each other, which can further suppress the entry of air into the electrolytic capacitor. The same resin as each other included in the insulating member and the package body is, for example, an epoxy resin.

The package body preferably includes a filler, in view of improving the strength and other properties of the package body.

On the other hand, the insulating member preferably includes a filler having a particle diameter smaller than that included in the package body, and more preferably includes no filler. When the insulating member is formed by impregnating the first part with a liquid resin, the liquid resin preferably includes a filler having a particle diameter smaller than that included in the package body, and more preferably includes no filler. In this case, the liquid resin can be easily impregnated deep into the recesses of the surface of the porous portion of the first part, and the insulating member can be easily formed. Also, the insulating member can be easily formed to be thin in thickness so that a plurality of the capacitor elements can be stacked.

(External Electrode)

The external electrode (external electrode on the anode side) is in contact with at least the end face of the first end. The external electrode may be in contact (physical contact) with the end A of the insulating member. When the capacitor element stack includes the spacer, the external electrode may be in contact with the end face of the spacer.

When the capacitor element includes the insulating member, the first end of the first part and the end A of the insulating member each have an end face exposed from the package body, the end faces flush with each other. This makes it easy to join the external electrode to the first end, and to bring the external terminal into contact, or even into close contact, with the end A. When the end A of the insulating member is closely in contact with the external electrode, the entry of air into the electrolytic capacitor through the boundary between the package body and the first end can be further suppressed.

For example, an electrolytic plating method or an electroless plating method may be used to form an external electrode in close contact with the end A, by allowing a metal to attach onto the end face of the end A. Also, for example, a physical vapor deposition method, a chemical vapor deposition method, or a cold spray method may be used to form an external electrode in close contact with the end A, by allowing gasified or solid metal particles to collide with the end face of the end A. A thermal spraying method may be used to form an external electrode in close contact with the end A, by allowing molten metal particles to collide with the end face of the end A. In this case, the molten metal particles attached onto the end face of the end A melts the end A to fuse with it, forming an external electrode welded to the end A.

The external electrode preferably has a first electrode layer and a second electrode layer formed on a surface of the first electrode layer. The first electrode layer covers the end face of the first end exposed from the package body, together with part of a surface of the package body. Covering the surface of the first end exposed from the package body, together with part of the surface of the package body, with the first electrode layer can suppress the formation of natural oxide film on the first end. In view of suppressing the formation of natural oxide film on the first end, the package body is preferably covered such that an area surrounding the exposed face of the first end exposed from the package body is covered with the first electrode layer. By covering the end face of the first end, and the end face of the end A and/or the end face of the spacer, the end faces not covered with the package body, together with part of the surface of the package body, with the first electrode layer, the formation of natural oxide film on the first end can be suppressed.

The first electrode layer is preferably a metal layer. The metal layer is, for example, a plating layer. The metal layer contains, for example, at least one selected from the group consisting of nickel, copper, zinc, tin, silver, and gold. The first electrode layer may be formed using, for example, a film formation technique, such as electrolytic plating, electroless plating, sputtering, vacuum vapor deposition, chemical vapor deposition (CVD), cold spraying, or thermal spraying. The above method can easily provide a first electrode layer in close contact with at least the end face of the first end and part of the package body. Even when the end face of the first end, as well as the end face of the end A of the insulating member and/or the end face of the spacer are exposed from the package body, according to the above method, a first electrode layer in close contact with these end faces and part of the surface of the package body can be easily formed.

Covering the first electrode layer with the second electrode layer can suppress the oxidation deterioration of the first electrode layer. The second electrode layer may be formed of, for example, an electrically conductive resin (composition) and/or a material exemplified for the first electrode layer. In view of the close contact with the first electrode layer, the second electrode layer is preferably an electrically conductive resin layer. The conductive resin layer includes, for example, a resin and an electrically conductive material dispersed in the resin. Examples of the resin include a cured product of a curable resin composition, and a thermoplastic resin (composition). Examples of the conductive material include a metal material, such as silver or copper, and an electrically conductive inorganic material, such as carbon. The second electrode layer may be a metal layer as exemplified for the above first electrode layer. The second electrode layer may be formed using a method exemplified for the above first electrode layer (e.g., film formation technique).

(Spacer)

The spacer may be made of, for example, a metal, such as copper, iron, or nickel, or an alloy material containing these.

The spacer is placed so as to be sandwiched between the first parts, when a plurality of the capacitor elements are stacked into a capacitor element stack or after the capacitor element stack is formed. After bringing the spacer into close contact with the first parts (or the porous portions), the above resin composition is charged into the space between the adjacent first parts, whereby the package body can be formed.

An example of the electrolytic capacitors according to the above aspects will be described below with reference to the drawings. It is to be noted, however, that the electrolytic capacitors according to the above aspects of the present invention are not limited thereto.

FIG. 1 is a schematic cross-sectional view of an electrolytic capacitor according to a first embodiment of the present invention.

As shown in FIG. 1, an electrolytic capacitor 11 includes a plurality of capacitor elements 10. The capacitor elements 10 each include an anode foil 3 having a first part 1 including a first end 1a, and a second part 2 including a second end 2a. In FIG. 1, the second part has a porous portion 5 at its surface. Specifically, the second part 2 has a core portion 4, and the porous portion (porous body) 5 formed on a surface of the core portion 4 by roughening (e.g., etching). On the other hand, the first part has no porous portion at its surface.

The capacitor element 10 includes a dielectric layer (not shown) formed on a surface of the second part 2 of the anode foil 3. The dielectric layer is formed along a surface of the porous portion 5. At least part of the dielectric layer covers the inner wall surfaces of the pores of the porous portion 5 and is formed along the inner wall surfaces thereof The capacitor element 10 includes a cathode part 6 covering at least part of the dielectric layer. The cathode part 6 includes a solid electrolyte layer 7 covering at least part of the dielectric layer, and a cathode leading layer covering at least part of the solid electrolyte layer 7. The surface of the dielectric layer has unevenness corresponding to the surface profile of the anode foil 3. The solid electrolyte layer 7 is preferably formed so as to fill such unevenness of the dielectric layer. The cathode leading layer includes a carbon layer 8 covering at least part of the solid electrolyte layer 7, and a silver paste layer 9 covering the carbon layer 8.

Part of the anode foil 3 where the solid electrolyte layer 7 is formed on the anode foil 3 with the dielectric layer (porous portion 5) interposed therebetween is the second part 2; part of the anode foil 3 where the solid electrolyte layer 7 is not formed on the anode foil 3, with the dielectric layer (porous portion 5) interposed therebetween is the first part 1.

In a region not facing the cathode part 6 of the anode foil 3, an insulation layer (or an electrically insulating member) 12 with electrically insulating properties is formed at a portion adjacent to the cathode part 6 so as to cover the surface of the anode foil 3, restricting the contact between the cathode part 6 and the second part 2. The insulation layer 12 is, for example, a resin layer with electrically insulating properties.

A plurality of the capacitor elements 10 are stacked, with a plurality of the anode foils 3 oriented in a similar direction and overlapped with each other. There are formed an anode stack portion where the first parts 1 are stacked, and a cathode stack portion where cathode parts 6 are stacked. In the plurality of the capacitor elements 10, the cathode parts 6 adjacent to each other in the stacking direction are electrically connected to each other via an adhesive layer 13 having electrical conductivity. The adhesive layer 13 is formed of, for example, an electrically conductive adhesive. The adhesive layer 13 contains, for example, silver.

The electrolytic capacitor 11 includes a package body 14 enclosing the capacitor elements 10 and exposing a plurality of the first ends 1a therefrom. The package body 14 has a substantially rectangular parallelepiped outer shape, and the electrolytic capacitor 11 also has a substantially rectangular parallelepiped outer shape. The package body 14 has a first side face 14a and a second side face 14b opposite the first side face 14a. The first ends 1a each have an end face being exposed from and flush with the first side face 14a of the package body 14.

In the plurality of the capacitor elements 10, the first parts 1 adjacent to each other in the stacking direction are preferably apart from each other, and part of the package body 14 is preferably present therebetween. In this case, the first parts 1, except the first ends 1a, are each covered with the package body 14, and the package body 14 is formed in close contact with each of the first parts 1. The first ends 1a are each independently exposed from the first side face 14a of the package body 14. Therefore, the entry of air into the electrolytic capacitor through between the first parts adjacent to each other in the stacking direction can be suppressed.

Furthermore, since no porous portion is formed at the surfaces of the first parts 1, the close contact between the package body 14 and each of the first parts 1 can be improved. Therefore, the entry of air through the interface between the package body and the first parts can be suppressed. Also, the entry of air from the first end exposed from the package body along the pores of the porous portion can be suppressed.

The electrolytic capacitor 11 includes an anode-side external electrode 15 electrically connected to the first ends 1a exposed from the package body 14. It is not necessary to bundle the first parts in order to electrically connect the first ends 1a exposed from the package body 14 to the anode-side external electrode 15, and with respect to the first parts, it is not necessary to allocate a certain length for bundling them. Therefore, as compared to when bundling the first parts, the ratio of the first part in the anode foil can be reduced, and the capacitance can be increased.

The anode-side external electrode 15 has an anode-side first electrode layer 15a and an anode-side second electrode layer 15b formed on a surface of the anode-side first electrode layer 15a. The anode-side first electrode layer 15a covers the end faces of the first ends 1a exposed from the package body 14, together with the first side face 14a of the package body 14.

The electrolytic capacitor 11 includes a cathode-side external electrode 16 electrically connected to the cathode part 6. Specifically, the package body 14 exposes therefrom ends 6a of the cathode parts 6 on the second end 2a side, as well as ends 13a of the adhesive layers 13 on the second end 2a side. The cathode-side external electrode 16 is electrically connected to the ends 6a of the cathode parts 6 and the ends 13a of the adhesive layers 13, the ends exposed from the package body 14. The ends 6a and the ends 13a each have an end face being exposed from and flush with the second side face 14b of the package body 14.

The cathode-side external electrode 16 has a cathode-side first electrode layer 16a and a cathode-side second electrode layer 16b formed on a surface of the cathode-side first electrode layer 16a. The cathode-side first electrode layer 16a covers the end faces of the ends 6a of the cathode parts 6 and the ends 13a of the adhesive layers 13, the end faces exposed from the package body 14, together with the second side face 14b of the package body 14.

Figure 2:
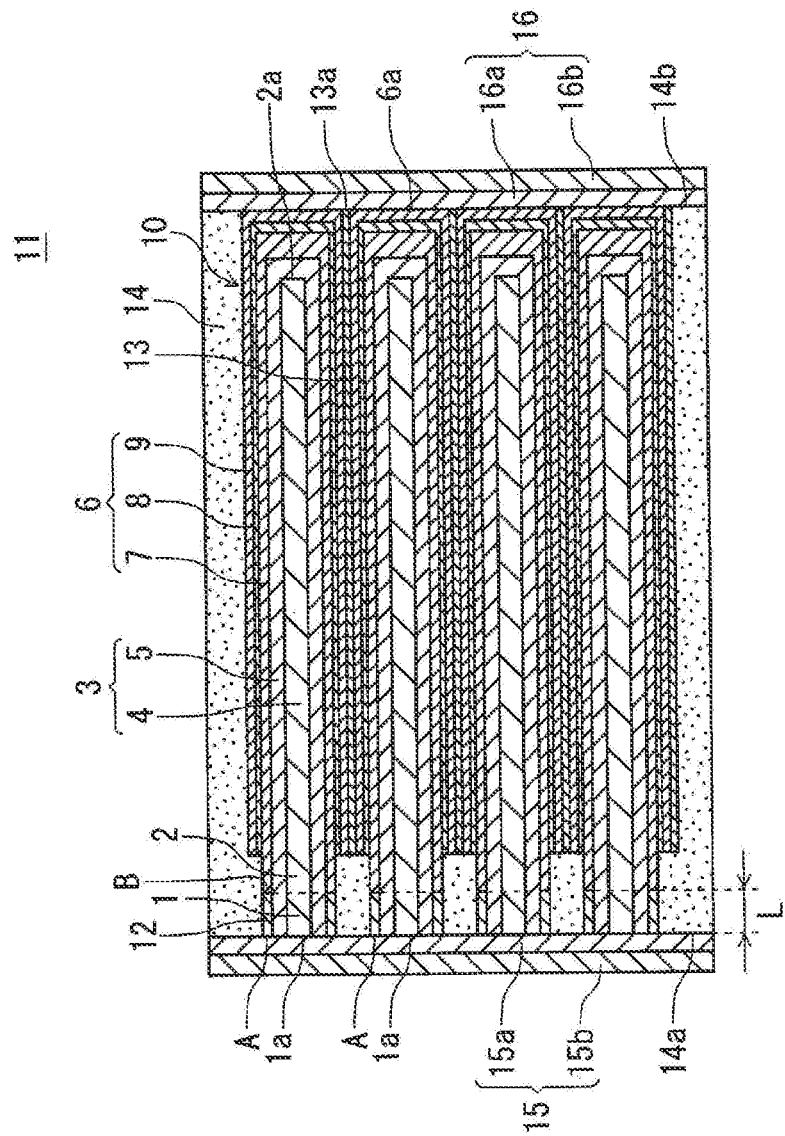
FIG. 2 A schematic cross-sectional view of an electrolytic capacitor according to a second embodiment of the present invention.

FIG. 2 is a schematic cross-sectional view of an electrolytic capacitor according to a second embodiment of the present invention.

As shown in FIG. 2, the electrolytic capacitor 11 includes a plurality of the capacitor elements 10. The capacitor elements 10 each include the anode foil 3 having the first part 1 including the first end 1a, and the second part 2 including the second end 2a. The anode foil 3 (first and second parts 1 and 2) has the core portion 4, and the porous portion (porous body) 5 formed on a surface of the core portion 4.

The capacitor element 10 includes a dielectric layer (not shown) formed on a surface of the anode foil 3 (first and second parts 1 and 2). The dielectric layer covers the porous portion 5 and is formed along the unevenness of the surface of the porous portion 5. That is, the surface of the dielectric layer has unevenness corresponding to the surface profile of the porous portion 5. An insulating member 12 has an end A on the first end 1a side and an end B on the second part 2 side. The first end 1a and the end A each have an end face, and the end faces are flush with each other.

The capacitor element 10 includes the cathode part 6 covering at least part of the dielectric layer formed on the surface of the second part 2. The cathode part 6 includes the solid electrolyte layer 7 covering at least part of the dielectric layer formed on the surface of the second part 2, and the cathode leading layer covering at least part of the solid electrolyte layer 7. The cathode leading layer includes the carbon layer 8 covering at least part of the solid electrolyte layer 7, and the silver paste layer 9 covering the carbon layer 8.

The insulation layer (electrically insulating member) 12 is disposed on the first part 1 with the dielectric layer interposed therebetween, restricting the contact between the cathode part 6 and the first part 1. The insulating member 12 is preferably formed so as to fill the unevenness of the surface of the first part 1.

A plurality of the capacitor elements 10 are stacked similarly to in FIG. 1, in which the anode stack portion and the cathode stack portion are formed. For the adhesive layer 13 also, the description of FIG. 1 can be referred to.

The plurality of the capacitor elements 10 are enclosed by the package body 14 as in FIG. 1. For the package body 14, the description of FIG. 1 can be referred to. In FIG. 2, however, a plurality of the ends A, together with a plurality of the first ends 1a, are exposed from the package body 14. The ends A each have an end face being exposed from and flush with the first side face 14a of the package body 14.

In the plurality of the capacitor elements 10, the insulating members 12 adjacent to each other in the stacking direction are apart from each other, and part of the package body 14 is present therebetween. When the insulating members are made thicker and directly overlapped with each other to form a stack of the capacitor elements, air may enter through the interface between the insulating members adjacent to each other. On the other hand, when part of the package body 14 is present between the insulating members 12 adjacent to each other, the adjacent insulating members 12 are each covered with the package body 14, and the package body 14 is formed in close contact with each of the adjacent insulating members 12. Therefore, the entry of air as above can be suppressed.

In the electrolytic capacitor 11, the end faces of the first ends 1a exposed from the package body 14 are each joined to the anode-side external electrode 15. In this way, the first parts 1 are each electrically connected to the anode-side external electrode 15. Therefore, the capacitance can be increased as in FIG. 1.

The anode-side external electrode 15 has the anode-side first electrode layer 15a and the anode-side second electrode layer 15b, as in FIG. 1. From the package body 14, however, the end faces of the ends A are also exposed. The first electrode layer 15a, therefore, covers the end faces of the ends A, as well as the end faces of the first ends 1a and the first side face 14a.

The cathode-side external electrode 16 is the same as in FIG. 1.

Figure 3:
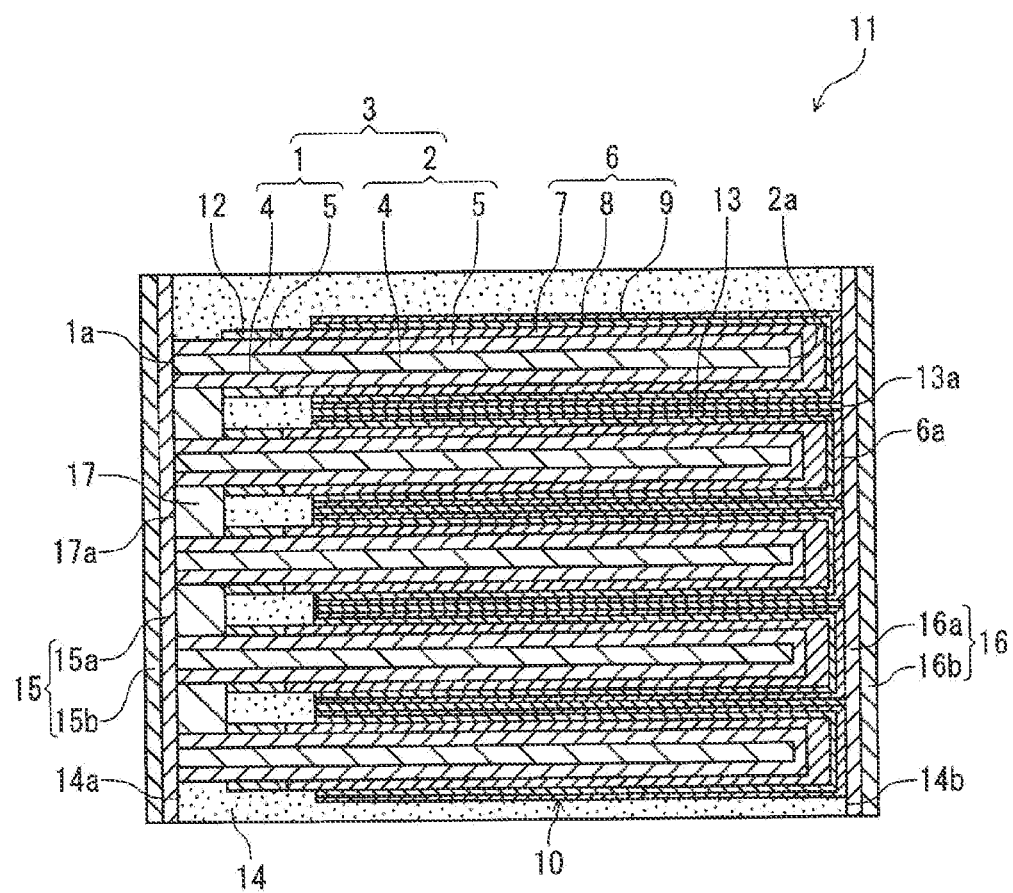
FIG. 3 A schematic cross-sectional view of an electrolytic capacitor according to a third embodiment of the present invention.

FIG. 3 is a schematic cross-sectional view of an electrolytic capacitor according to a third embodiment of the present invention.

In FIG. 3, the surface of the first part 1 of the anode foil 3 also has the porous portion 5 formed by surface roughening, such as etching. The electrolytic capacitor 11 includes a plurality of spacers 17 arranged between the capacitor elements 10 adjacent to each other, on the first part 1 side. The external electrode 15 further covers end faces 17a of the spacers 17. For other than these, the description of FIG. 1 can be referred to.

In FIG. 3, the spacer 17 provides a space between the first parts 1 of the electrolytic capacitor 11 adjacent to each other in the stacking direction. The spacer 17 has an end face 17*a* being exposed from and flush with the first side face 14*a* of the package body 14.

With respect to the layout of the spacers 17 when the electrolytic capacitor 11 is viewed from its stacking direction, the spacers 17 are each placed on at least a partial region of the first part 1. When the electrolytic capacitor 11 is viewed from its stacking direction, the size, shape, and placed position of the spacers 17 may be different from one spacer 17 to another. The spacer 17 can maintain the space between the first parts 1 adjacent to each other in stacking the capacitor elements 10. In forming the package body 14, by filling the space entirely with the package body 14, the close contact between the first parts (and the porous portions) and the package body can be improved.

When the first parts are bundled and directly overlapped with each other, air is likely to enter through the gap between the first parts adjacent to each other. On the other hand, when the package body is present between the first parts adjacent to each other, the first parts except the first ends are each covered with the package body, and the package body is formed in close contact with each of the first parts. Also, the first ends are each independently exposed from the first side face of the package body. Thus, the entry of air can be further suppressed, as compared to when the first parts are bundled and overlapped.

[Manufacturing Method of Electrolytic Capacitor]

The electrolytic capacitors according to the above aspects of the present invention can be manufactured by a method including: a first step of preparing an anode foil; a second step of obtaining a capacitor element; a third step of covering the capacitor element with a package body; a fourth step of forming an end face of the first part, to expose the end face from the package body; and a fifth step of bringing the end face of the first part into contact with an external electrode. The manufacturing method may further include a sixth step of disposing an insulation layer (electrically insulating member) on least part of the anode foil. The method may further include a seventh step of bringing the cathode part into contact with an external electrode on the cathode side. When the electrolytic capacitor includes a plurality of the capacitor elements, the method may include an eighth step of disposing a plurality of spacers each between the adjacent capacitor elements, on the first part side.

Each step of a manufacturing method of an electrolytic capacitor according to an embodiment of the present invention will be described below.

(First Step)

In the first step, an anode foil with a dielectric layer formed thereon is prepared. Specifically, an anode foil having a first part including one end and a second part including an other end opposite the one end, the anode foil including a dielectric layer formed on at least a surface of the second part, is prepared. The first step includes, for example, a step of forming a porous portion at a surface of the anode foil, and a step of forming a dielectric layer on a surface of the porous portion. Specifically, the anode foil prepared in the first step has a first part including an end-to-be-removed (the above one end) and a second part including a second end (the above other end). The porous portion is preferably formed at at least a surface of the second part.

The porous portion may be formed at the surface of the anode foil in any way as long as the surface of the anode foil becomes uneven, for example, by roughening the surface of the anode foil by etching (e.g., electrolytic etching).

The dielectric layer may be formed by subjecting an anode foil to a chemical treatment. The chemical treatment can be performed by, for example, immersing the anode foil in a chemical solution to impregnate the chemical solution into the surface of the anode foil, and applying a voltage across the anode foil serving as an anode and a cathode immersed in the chemical solution. When the anode foil has a porous portion at its surface, the dielectric layer is formed along the unevenness of the surface of the porous portion.

(Sixth Step)

In the case of manufacturing an electrolytic capacitor including an electrically insulating member (or an insulation layer), the sixth step of disposing the insulating member is performed after the first step and before the second step. In the sixth step, the insulating member is disposed on part of the anode foil. Specifically, in the sixth step, the insulating member is disposed on the first part of the anode foil, with the dielectric layer interposed therebetween. The insulating member has an end C on the end-to-be-removed side and an end B on the second part side. The insulating member is disposed so as to insulate the first portion from a cathode part to be formed in a later step.

In the sixth step, a sheet-like electrically insulating member (e.g., resin tape) may be bonded to part (e.g., first part) of the anode foil. Even when using an anode foil with a porous portion formed at its surface, by compressing the first part and flattening the unevenness of the surface, the sheet-like insulating member can be closely brought into contact with the first part. The sheet-like insulating member preferably has an adhesive layer at the surface facing the first part.

Other than the above, in the sixth step, an insulating member may be formed by applying or impregnating a liquid resin onto or into part of the anode foil (e.g., first part). For example, the application or impregnation of the liquid resin is followed by curing. In this case, the insulating member can be easily formed in close contact with the first part. The liquid resin may be, for example, a curable resin composition as exemplified in the third step (forming a package body), a resin solution of a resin in a solvent, and others.

When the anode foil has a porous portion at its surface, it is preferable to apply or impregnate a liquid resin onto or into part of the surface of the anode foil (e.g., surface of the first part). In this case, the insulating member can be easily formed so as to fill the unevenness of the surface of the porous portion of the first part. The liquid resin can easily flow into the recesses on the surface of the porous portion, facilitating the formation of the insulating member inside the recesses, too. Since the porous portion at the surface of the anode foil can be thus protected with the insulating member, the porous portion of the anode foil is unlikely to collapse when the anode foil is partially removed together with the package body in the fourth step. Also, since the surface of the porous portion of the anode foil is firmly in close contact with the insulating member, the anode foil is unlikely to peel off from the surface of the porous portion when the anode foil is partially removed together with the package body in the fourth step.

(Second Step)

In the second step, a cathode part is formed on the anode foil, to obtain a capacitor element. When the insulating member is disposed in the sixth step, in the second step, a cathode part is formed on where the insulating member is not disposed on the anode foil, to obtain a capacitor element. Specifically, in the second step, at least part of the dielectric layer formed on the surface of the second part of the anode foil is covered with the cathode part.

The step of forming a cathode part includes, for example, a step of forming a solid electrolyte layer covering at least part of the dielectric layer, and a step of forming a cathode leading layer covering at least part of the solid electrolyte layer.

The solid electrolyte layer can be formed by, for example, chemically and/or electrochemically polymerizing a raw material monomer on the dielectric layer. The solid electrolyte layer may be formed by depositing a processing solution containing an electrically conductive polymer, followed by drying. The processing solution may further contain other components, such as a dopant. The conductive polymer may be, for example, poly(3,4-ethylenedioxythiophene) (PEDOT). The dopant may be, for example, polystyrene sulfonic acid (PSS). The processing solution is a dispersion or solution of the conductive polymer. Examples of a dispersion medium (solvent) include water, an organic solvent, and a mixture thereof.

The cathode leading layer can be formed by, for example, providing a carbon layer and then a silver paste layer on the solid electrolyte layer.

(Third Step)

In the third step, the capacitor element is covered with a package body. The package body can be formed by, for example, injection molding. The package body can be formed by, for example, using a predetermined mold, charging a curable resin composition or a thermoplastic resin (composition) into a predetermined place, so as to cover the capacitor element.

The curable resin composition may include, in addition to the curable resin, for example, a filler, a curing agent, a polymerization initiator, and/or a catalyst. Examples of the curable resin include epoxy resin, phenolic resin, urea resin, polyimide, polyamide imide, polyurethane, diallyl phthalate, and unsaturated polyester. Examples of the thermoplastic resin include polyphenylene sulfide (PPS) and polybutylene terephthalate (PBT). A thermoplastic resin composition containing a thermoplastic resin and a filler may be used.

The filler is, for example, preferably electrically insulating particles and/or fibers. Examples of an electrically insulating material constituting the filler include: an electrically insulating compound (e.g., oxide), such as silica or alumina; glass; and a mineral material (e.g., talc, mica, clay). The package resin may contain one kind or two or more kinds of these fillers.

(Fourth Step)

In the fourth step, an end face of the first part is formed on the one end (or end-to-be-removed) side after the third step, so that the end face is exposed from the package body. Specifically, on the one end side of the anode foil, at least the anode foil is partially removed together with the package body, to form at least a first end (specifically, an end face of the first end) of the anode foil, and expose at least the first end from the package body. An exemplary method of exposing the first end from the package body is, after the capacitor element is covered with the package body, polishing the surface of the package body, or partially cutting the package body such that the first end is exposed from the package body. The first part may be partially cut away together with the package body. In this case, the first end including no porous portion and having a surface with no natural oxide film formed thereon can be easily exposed from the package body, and a low-resistance and reliable connection can be obtained between the first part and the external electrode.

In the fourth step, on the one end side of the anode foil, the anode foil and the spacer may be partially removed together with the package body, to expose end faces of the first end and the spacer from the package body. In this case, the anode foil and the spacer each have an end face exposed from the package boy, the end faces flush with each other. In this way, the end face of the anode foil and the end face of the spacer, the end faces flush with the surface of the package body, can be each easily exposed from the package body. In partially removing the anode foil and the spacer, it is preferably to cut the package body at a position between third and fourth ends of the spacer, where the third end is on the first part side and the fourth end is on the second part side. A preferable method of cutting the package body is dicing. An exposed end face of the first end of the first part and an exposed end face of the spacer thus appear on the cut face.

In the fourth step, on the one end side of the anode foil, the anode foil and the insulating member may be partially removed together with the package body, to expose an end face of the first end and an end face of the insulating member from the package body. In this case, the anode foil and the insulating member each have an end face exposed from the package boy, the end faces flush with each other. In this way, the end face of the anode foil and the end face of the insulating member, the end faces flush with the surface of the package body, can be each easily exposed from the package body.

Specifically, in the fourth step, on the one end side of the anode foil, the first part and the insulating member are partially removed together with the package body. As a result of partially removing the first part including one end and the insulating member including the end C from the capacitor element, the first end and the end A each having an end face exposed from the package body, the end faces flush with each other, are formed in the first part and the insulating member, respectively. The end faces of the first end and the end A are each flush with the exposed face of the package body.

Since the insulating member can be disposed in close contact with the first part and the package body, the insulating member is unlikely to peel off or displace from the first part during the removal on the one end side.

Another option is to remove the package body only, in alignment with the ends of the anode foil and the insulating member. In this case, however, it is difficult to expose the end face of the anode foil and the end face of the insulating member from the package body so that the end faces become flush with the exposed face of the package body.

Through the fourth step, an end face with no natural oxide film formed thereon of the anode foil (first part) can be easily exposed from the package body, and a low-resistance and reliable connection can be obtained between the anode foil (specifically, the first part) and the external electrode.

In the fourth step, it is preferable to partially remove the anode foil (specifically, the first part) and the insulating member from the capacitor element so that the length of the insulating member measured from the end A to be exposed from the package body to the end B on the cathode part side becomes 0.5 mm or more and 3 mm or less.

Here, an example of the fourth step will be described with reference to FIG. 4. FIG. 4 is a schematic cross-sectional view of an example of an intermediate product (capacitor element covered with package body) produced by the third step.

A capacitor element 30 includes: an anode foil 23 having a first part 21 including an end-to-be-removed 21a and the second part 2 including the second end 2a; and an electrically insulating member 32 disposed on the first part 21 including the end-to-be-removed 21a. The insulating member 32 has the end C on the end-to-be-removed 21a side and the end B on the second part 2 side. Except the above, the capacitor element 30 is similar to the capacitor element 10 of FIG. 2. A package body 34 covers the end-to-be-removed 21a of the first part 21 and the end C of the insulating member 32. The external electrodes on the anode side and on the cathode side are not disposed. Except the above, an intermediate product 31 is similar to the electrolytic capacitor 11 of FIG. 2.

When the intermediate product 31 of FIG. 4 is produced by the third step, in the fourth step, the first part 21 and the insulating member 32 are partially removed together with the package body 34 along the broken line X shown in FIG. 4, to separate part of the first part 21 including the end-to-be-removed 21a and part of the insulating member 32 including the end C, away from the capacitor element 30. In this way, the package body 14 having the first side face 14a, the first part 1 including the first end 1a exposed from the package body 14, and the insulating member 12 including the end A exposed from the package body 14, as illustrated in FIG. 2, can be formed. The first end 1a and the end A each have an end face flush with the first side face 14a of the package body.

(Fifth Step)

In the fifth step, the end face of the anode foil (the first end) exposed from the package body is brought into contact with an external electrode on the anode side. The end face of the first end and the external electrode may be brought into contact with each other by any means as long as electrical connection is achieved therebetween; for example, they may be joined to each other. Preferable methods of bringing the end face of the first end into contact with the external electrode include electrolytic plating, electroless plating, physical vapor deposition, chemical vapor deposition, cold spraying, and/or thermal spraying. By using these methods, the external electrode can be closely brought into contact with the first end. When the anode foil is partially removed together with the spacer and/or the insulating member in the fourth step, the external electrode can be closely brought into contact with the first end, as well as with the end of the spacer and/or the end A of the insulating member. Since the fourth step forms the first end of the first part, and the end of the spacer and/or the end A of the insulating member each having an end face exposed from the package body, the end faces flush with each other, the external electrode can be easily joined to the first end, and at the same time, can be brought closely into contact with the end of the spacer and/or the end A of the insulating member.

The external electrode on the anode side preferably includes an anode-side first electrode layer and an anode-side second electrode layer. The fifth step preferably includes: a step of covering at least the end face of the anode foil exposed from the package body, together with the at least part of the exposed face of the package body, with an anode-side first electrode layer; and a step of forming an anode-side second electrode layer on the anode-side first electrode layer. The anode side first and second electrode layers may be as those exemplified above. In the step of covering the end face of the anode foil and the exposed face of the package body with the first electrode layer, the end face of the anode foil and at least part of the exposed face of the package body may be covered with the first electrode layer, together with the end face of the end A of the insulating member and/or the end face of the spacer, the end faces exposed from the package body.

(Seventh Step)

A seventh step of bringing the cathode part into contact with an external electrode on the cathode side may be further performed. The cathode-side external electrode may be as those exemplified for the anode-side external electrode. In the case of manufacturing the electrolytic capacitor configured as in FIGS. 1 to 3, the ends of a plurality of the cathode parts on the second end side and the ends of a plurality of the adhesive layers on the second end side exposed from the package body are brought into contact with the external electrode, so as to be electrically connected thereto; for example, they may be joined to each other. In this case, in the third step, the package body is formed so that the ends of the cathode parts on the second end side and those of the adhesive layers on the second end side are exposed therefrom.

(Eighth Step)

In the case of manufacturing an electrolytic capacitor including a spacer, an eighth step is performed to place a spacer between the adjacent capacitor elements, on the first part side, in the capacitor element stack. The eighth step can be performed prior to the third step. Specifically, the spacer is placed so as to be sandwiched between the first parts, when a plurality of the capacitor elements are stacked into a capacitor element stack or after the capacitor element stack is formed.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The electrolytic capacitor according to the present invention is usable for various applications requiring excellent sealing ability even in a highly humid atmosphere.

REFERENCE SIGNS LIST

1: first part (anode leading part), 1a: first end, 2: second part (cathode forming part), 2a: second end, 3: anode foil, 4: core portion, 5: porous portion, 6: cathode part, 6a: end of the cathode part on the second end side, 7: solid electrolyte layer, 8: carbon layer, 9: silver paste layer, 10: capacitor element, 11: electrolytic capacitor, 12: insulation layer (insulating member) 13: adhesive layer, 13a: end of the adhesive layer on the second end side, 14: package body, 14a: first side face of the package body, 14b: second side face of the package body, 15: anode-side external electrode, 15a: anode-side first electrode layer, 15b: anode-side second electrode layer, 16: cathode-side external electrode, 16a: cathode-side first electrode layer, 16b: cathode-side second electrode layer, 17: spacer, 17a: exposed end face of the spacer, 21: first part of the intermediate product, 21a: end-to-be-removed, 23: anode foil of the intermediate product, 30: capacitor element of the intermediate product, 31: intermediate product, 32: insulating member of the intermediate product, 34: package product of the intermediate body, A: end of the insulating member on the first end side, B: end of the insulating member on the second part side, C: end of the insulating member on the end-to-be-removed side

The invention claimed is:

1. An electrolytic capacitor comprising a stack of a plurality of capacitor elements,
the stack including:
at least one of the capacitor elements including:
an anode foil having a first part including a first end, and a second part including a second end,
a dielectric layer formed on at least a surface of the second part, and
a cathode part covering at least part of the dielectric layer;
a package body enclosing the capacitor element; and
an external electrode,
wherein the stack includes a spacer disposed between the capacitor elements adjacent to each other, on a side of the first part,
an end face of the first end and an end face of the spacer are each exposed from the package body and in contact with the external electrode, and
the spacer is apart from the cathode part at least by a part of the package body.

2. The electrolytic capacitor of claim 1, wherein the at least one of the capacitor elements includes an electrically insulating member insulating the first part from the cathode part.

3. The electrolytic capacitor of claim 2, wherein the insulating member includes a resin tape.

4. The electrolytic capacitor of claim 2, wherein
the spacer is apart from the cathode part by the part of the package body and the insulating member,
the insulating member has an end A on a side of the first end and an end B on a side of the second part, and
an end face of the end A is in contact with the spacer.

5. The electrolytic capacitor of claim 1, wherein the spacer is made of a metal material.

6. The electrolytic capacitor of claim 1, wherein
the anode foil has a porous portion, and
at a portion of the first part adjacent to the spacer, the porous portion is compressed and joined to the spacer.

7. The electrolytic capacitor of claim 1, wherein the first part and the spacer adjacent to each other are welded to each other.

8. A manufacturing method of an electrolytic capacitor comprising a stack of a plurality of capacitor elements, the method comprising:
a step of preparing the plurality of the capacitor elements comprising the following first step and second step:
the first step of preparing an anode foil having a first part including one end, and a second part including an other end opposite the one end, the anode foil having a dielectric layer formed on at least a surface of the second part, and
the second step of forming a cathode part covering at least part of the dielectric layer, to obtain a capacitor element;
a stacking step of stacking the plurality of the capacitor elements to obtain the stack;
a third step of covering the stack with a package body;
a fourth step of forming an end face of the first part, on a side of the one end, after the third step, to expose the end face from the package body;
a fifth step of bringing the end face of the first part into contact with an external electrode; and
a sixth step placing a spacer between the adjacent capacitor elements, on the first part side and apart from the cathode part, in the stack prior to the third step, when the plurality of the capacitor elements is stacked in the stacking step or after the stack is formed,
wherein the first step includes a step of forming a porous portion at a surface of the anode foil, and a step of forming the dielectric layer on a surface of the porous portion of at least the second part,
in the fourth step, the anode foil and the spacer are partially removed together with the package body, to expose the end face of the first part and an end face of the spacer from the package body,
in the fifth step, the end face of the first part and the end face of the spacer into contact with the external electrode, and
in the third step, a part of the package body fills a space between the spacer and the cathode part.

9. The manufacturing method of claim 8, wherein
the at least one of the capacitor elements includes an electrically insulating member insulating the first part from the cathode part, and
the spacer is apart from the cathode part by the part of the package body and the insulating member.

* * * * *